United States Patent
K

(10) Patent No.: US 12,032,509 B2
(45) Date of Patent: Jul. 9, 2024

(54) SYSTEM AND METHOD FOR CAMERA SERIAL INTERFACE LANE IMPLEMENTATION BETWEEN CAMERA SENSOR AND HOST PROCESSOR

(71) Applicant: E-CON SYSTEMS INDIA PRIVATE LIMITED, Chennai (IN)

(72) Inventor: Rajesh K, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 274 days.

(21) Appl. No.: 17/709,501

(22) Filed: Mar. 31, 2022

(65) Prior Publication Data

US 2023/0319252 A1    Oct. 5, 2023

(51) Int. Cl.
 *G06F 13/42*   (2006.01)
 *H04N 13/239*  (2018.01)
(52) U.S. Cl.
 CPC .. *G06F 13/4282* (2013.01); *G06F 2213/0002* (2013.01); *H04N 13/239* (2018.05)
(58) Field of Classification Search
 CPC ........ G06F 13/4282; G06F 2213/0002; H04N 13/239
 See application file for complete search history.

(56) References Cited

U.S. PATENT DOCUMENTS

| | | | |
|---|---|---|---|
| 9,471,955 B2 | 10/2016 | Holland et al. | |
| 10,602,119 B1* | 3/2020 | Bakhtazad | G06F 1/10 |
| 2019/0207681 A1* | 7/2019 | Sundaram | H04B 10/803 |

OTHER PUBLICATIONS

K. Lim, G. S. Kim, S. Kim and K.-H. Baek, "A multi-lane MIPI CSI receiver for mobile camera applications," in IEEE Transactions on Consumer Electronics, vol. 56, No. 3, pp. 1185-1190, Aug. 2010, doi: 10.1109/TCE.2010.5606244. (Year: 2010).*
U. K. Malviya, A. swain and G. Kumar, "Tiny I2C Protocol for Camera Command Exchange in CSI-2: A Review, " 2020 International Conference on Inventive Computation Technologies (ICICT), Coimbatore, India, 2020, pp. 149-154, doi: 10.1109/ICICT48043.2020.9112536. (Year: 2020).*
PI3WVR648 2:1 MIPI 4-Data Lane Switch, Sep. 2019.
TS5MP646 4 Data Lane 2:1 MIPI Switch (10-Channel, 2:1 Analog Switch), Jan. 2018.
SN65DPHY440SS: 2 data lane MIPI CSI-2 switch.
NL3HS644 2:1 MIPI D-PHY (1.5 Gbps) 4-Data Lane Switch, Nov. 2015.

* cited by examiner

*Primary Examiner* — Eric T Oberly
(74) *Attorney, Agent, or Firm* — Jason C. Cameron

(57) ABSTRACT

A system for camera serial interface lane implementation between camera sensor and host processor is disclosed. An input data receiving unit receives first input signal from a first camera sensor in at least one of a two-lane camera serial interface configuration (CSI) or a four-lane CSI configuration; receives second input signal from a second camera sensor in the two-lane CSI. A data selector device selecting a first port for forwarding input signal when the first input signal is received in the two-lane CSI, selecting a second port for forwarding the input signal when the first input signal is obtained in the four-lane CSI configuration. A host processor block including a first receiver block to generate a first output signal when the first input signal is received from the first port, a second receiver block generates a second output signal when the first input signal is obtained from the second port.

14 Claims, 3 Drawing Sheets

SYSTEM AND METHOD FOR CAMERA SERIAL INTERFACE LANE IMPLEMENTATION BETWEEN CAMERA SENSOR AND HOST PROCESSOR

BACKGROUND

Embodiments of the present disclosure relate to a field of embedded camera system and more particularly to a system and a method for camera serial interface lane implementation between camera sensor and host processor.

Embedded vision is quickly gaining more prominence in artificial intelligence (AI), the internet of things (IoT), and other emerging technology-based applications. The embedded vision technology offers a wide range of embedded vision cameras that includes MIPI camera modules, GMSL cameras, stereo cameras, etc. with varying resolution. These cameras are designed to work with one or more high-end processors. Amongst all, the mobile industry processor interface (MIPI) is one of the most popular and convenient ways of interfacing the embedded cameras with a host processor. There are several types of mobile industry processor interfaces used in various applications such as camera serial interface (CSI) 1, CSI 2, CSI 3 and the like. Such types of the MIPI are used in providing interfaces between multiple cameras or image sensors with any host processor that is having MIPI receiver interface.

Conventionally, the interfaces between multiple cameras or the image sensors with the host processor requires individual board design for interfacing host processor having MIPI receiver with camera module or sensor MIPI transmitter, as each host processor's MIPI receiver architecture is different and unique from each other. However, individual board design for the host processor MIPI receiver architecture creates difficulty in configuring with any types of camera sensors which results in increase of manufacturing cost. Moreover, such a conventional system is unable to support different formats of data transmitted from two or more sensors connected with a MIPI receiver of the host processor. Furthermore, such a conventional system is unable to support two lane and four lane MIPI transmitters simultaneously. In addition, conventional system has inability to support host processor MIPI receiver architecture with two lane and four lane MIPI transmitters dynamically.

Hence, there is a need for an improved system and a method for camera serial interface lane implementation between camera sensor and host processor is disclosed.

BRIEF DESCRIPTION

In accordance with an embodiment of the present disclosure, a system for camera serial interface lane implementation between camera sensor and host processor is disclosed. The system includes an input data receiving unit configured to receive first input signal from a first camera sensor in at least one of a two-lane camera serial interface configuration or a four-lane camera serial interface configuration. The input data receiving unit is also configured to receive second input signal from a second camera sensor in the two-lane camera serial interface configuration. The system includes a data selector device which includes a first port and a second port. The data selector device is configured to select the first port for forwarding input signal when the first input signal from the first camera sensor is received by the input data receiving unit in the two-lane camera serial interface configuration. The data selector device is also configured to select the second port for forwarding the input signal when the first input signal from the first camera sensor is received by the input data receiving unit in the four-lane camera serial interface configuration. The system also includes a host processor block which includes a first receiver block configured to generate a first output signal when the first input signal is obtained from the first port selected in the two-lane camera serial interface configuration and the second port selected in the four-lane camera serial interface configuration respectively. The host processor block also includes a second receiver block configured to generate a second output signal when the first input signal is obtained from the second port selected in the four-lane camera serial interface configuration. The host processor block is also configured to provide the interface with the first camera sensor and the second camera sensor for data transmission based on the first output signal and the second output signal generated.

In accordance with another embodiment of the present disclosure, a method for camera serial interface lane implementation between camera sensor and host processor is disclosed. The method includes receiving, by an input data receiving unit, first input signal from a first camera sensor in at least one of a two-lane camera serial interface configuration or a four-lane camera serial interface configuration. The method also includes receiving, by the input data receiving unit, second input signal from a second camera sensor in the two-lane camera serial interface configuration. The method also includes selecting, by a data selector device, the first port for forwarding input signal when the first input signal from the first camera sensor is received by the input data receiving unit in the two-lane camera serial interface configuration. The method also includes selecting, by the data selector device, the second port for forwarding the input signal when the first input signal from the first camera sensor is received by the input data receiving unit in the four-lane camera serial interface configuration. The method also includes generating, by a first receiver block of a host processor, a first output signal when the first input signal is obtained from the first port selected in the two-lane camera serial interface configuration and the second port selected in the four-lane camera serial interface configuration respectively. The method also includes generating, by a second receiver block of the host processor, a second output signal when the first input signal is obtained from the second port selected in the four-lane camera serial interface configuration. The method also includes providing, by the host processor, the interface with the first camera sensor and the second camera sensor for data transmission based on the first output signal and the second output signal generated.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
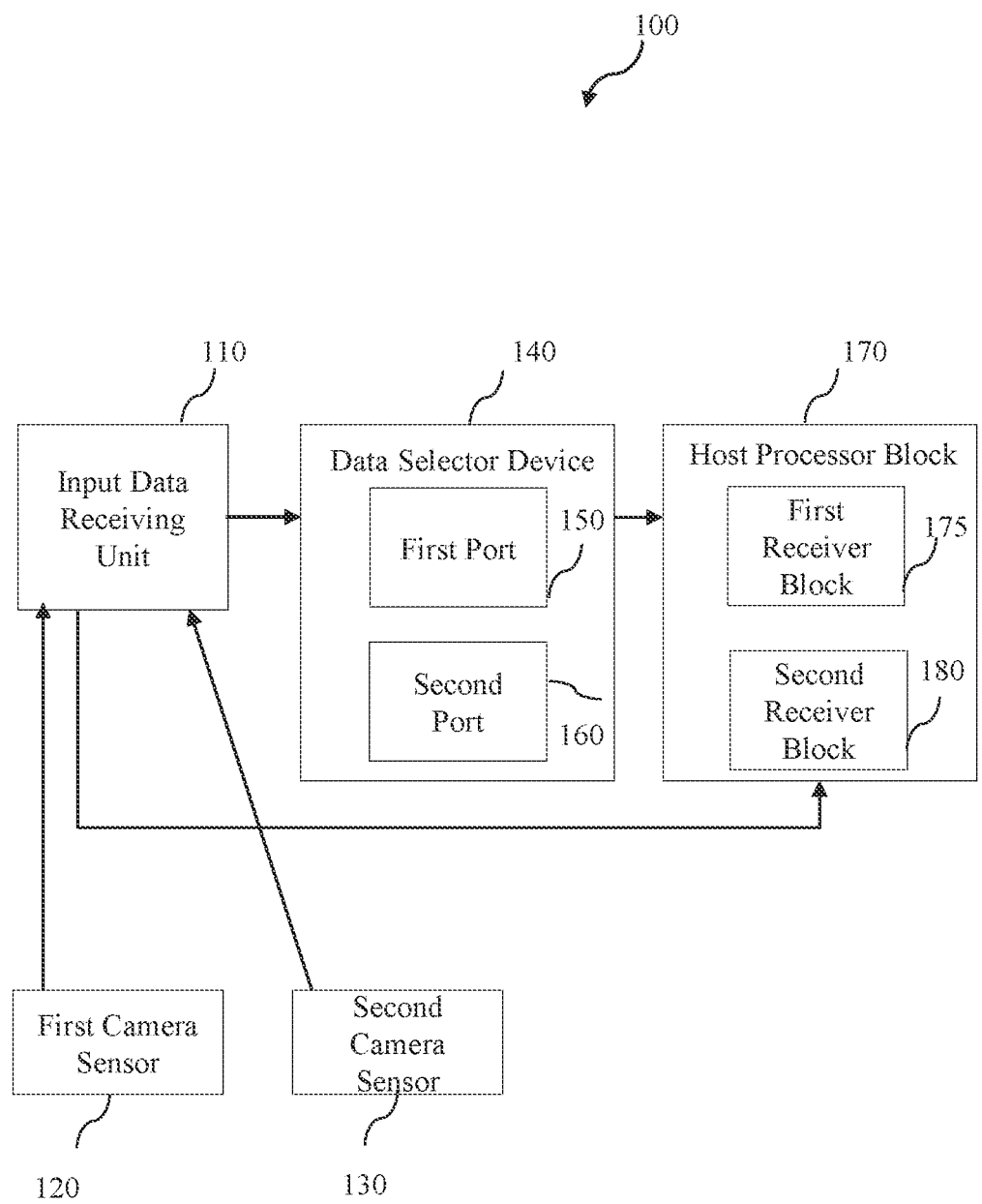
FIG. 1 is a block diagram of a system for camera serial interface lane implementation between camera sensor and host processor in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a". "an", and "the" include plural references unless the context clearly dictates otherwise.

Embodiments of the present disclosure relate to a system and a method for camera serial interface lane implementation between camera sensor and host processor. The system includes an input data receiving unit configured to receive first input signal from a first camera sensor in at least one of a two-lane camera serial interface configuration or a four-lane camera serial interface configuration. The input data receiving unit is configured to receive second input signal from a second camera sensor in the two-lane camera serial interface configuration. The system includes a data selector device which includes a first port and a second port. The data selector device is configured to select the first port for forwarding input signal when the first input signal from the first camera sensor is received by the input data receiving unit in the two-lane camera serial interface configuration. The data selector device is also configured to select the second port for forwarding the input signal from the first camera sensor when the first input signal is received by the input data receiving unit in the four-lane camera serial interface configuration. The system also includes a host processor block which includes a first receiver block configured to generate a first output signal when the first input signal is obtained from the first port selected in the two-lane camera serial interface configuration and the second port selected in the four-lane camera serial interface configuration respectively. The host processor block also includes a second receiver block configured to generate a second output signal when the first input signal is obtained from the second port selected in the four-lane camera serial interface configuration. The host processor block is also configured to provide the interface with the first camera sensor and the second camera sensor for data transmission based on the first output signal and the second output signal generated.

FIG. 1 is a block diagram of a system 100 for camera serial interface lane implementation between camera sensor and host processor in accordance with an embodiment of the present disclosure. The system 100 includes an input data receiving unit 110 configured to receive first input signal from a first camera sensor 120 in at least one of a two-lane camera serial interface (CSI) configuration or a four-lane camera serial interface configuration. In one embodiment, the first camera sensor 110 may include a two-lane (2-lane) camera sensor or a four-lane (4-lane) camera sensor.

The input data receiving unit 110 is configured to receive second input signal from a second camera sensor 130 in the two-lane camera serial interface configuration. In another embodiment, the second camera sensor may include a two-lane camera sensor. In such embodiment, the first camera sensor and the second camera sensor may include at least one of a charge coupled device (CCD) sensor, an electron multiplying charge-coupled device sensor (EMCCD), a complementary metal oxide semiconductor sensor (CMOS) or a back illuminated complementary metal oxide semiconductor sensor. As used herein, the term 'first input signal' is defined as an input data and selected input obtained from the first camera sensor in both dual lane and the quad lane CSI configuration. Again, the 'second input signal' is defined as an input data and selected clock signal obtained from the second camera sensor in a dual lane CSI configuration.

The system 100 includes a data selector device 140 which includes a first port 150 and a second port 160. The data selector device 140 is configured to select the first port 150 for forwarding input signal when the first input signal from the first camera sensor is received by the input data receiving unit 110 in the two-lane camera serial interface configuration. In one embodiment, the data selector device 140 may include a 2:1 mobile industry processor interface multiplexer integrated circuit (MIPI MUX IC). As used herein, the term '2:1 MUX' is defined as 2-to-1 multiplexer consisting of two inputs DO and DI, one selects input S and one output Ym.

The data selector device 140 is also configured to select the second port 160 for forwarding the input signal when the first input signal from the first camera sensor is received by the input data receiving unit in the four-lane camera serial interface configuration. In one embodiment, the data selector device enables selection of the first port and the second port based on a predefined programmable logic. In such embodiment, the predefined programmable logic may include integrated circuit programming. In another embodiment, the data selector device may enable selection of the first port and the second port through manual breadboard connection.

The system 100 also includes a host processor block 170 which includes a first receiver block 175 configured to generate a first output signal when the first input signal is obtained from the first port selected in the two-lane camera serial interface configuration and the second port selected in the four-lane camera serial interface configuration respectively. As used herein, the term 'first output signal' is representative of output data obtained from the first port in case of the 2-lane and 4 lane CSI configuration. In one embodiment, the host processor block may include at least one of a Xavier system on module (SOM) camera serial interface processor. In such embodiment, the host processor block may include, but not limited to, NVIDIA$^R$ Jetson™ $^M$, NXP i.MX8, Rockchip, Raspberry Pi 4, Google coral, Xilinx, NVIDIA TX2 and the like. As used herein, the term 'SOM' is defined as a cost-effective embedded platform used in many applications such as IoT. Test and measurement, industrial HMI, eBook Reader, wearable, drone payload, deep learning, automation, medical imaging, industrial control, remote data acquisition and the like.

The host processor block 170 also includes a second receiver block 180 configured to generate a second output signal when the first input signal is obtained from the second port selected in the four-lane camera serial interface configuration. As used herein, the term 'second output signal' is representative of output data obtained from the second port in case of the 4 lane CSI configuration. The host processor block 170 is also configured to provide the interface with the first camera sensor 120 and the second camera sensor 130 for data transmission based on the first output signal and the second output signal generated. In one embodiment, the first receiver block and the second receiver block may include a dual lane camera serial interface block or a quad lane camera serial interface block. In some embodiment, the host processor is interfaced with the first camera sensor and the second camera sensor by using a single embedded board design architecture. The single embedded board design for both 4lane and 2lane camera interface between the host processor and camera sensor handles camera resolution, frame rate and format and the like.

Figure 2:
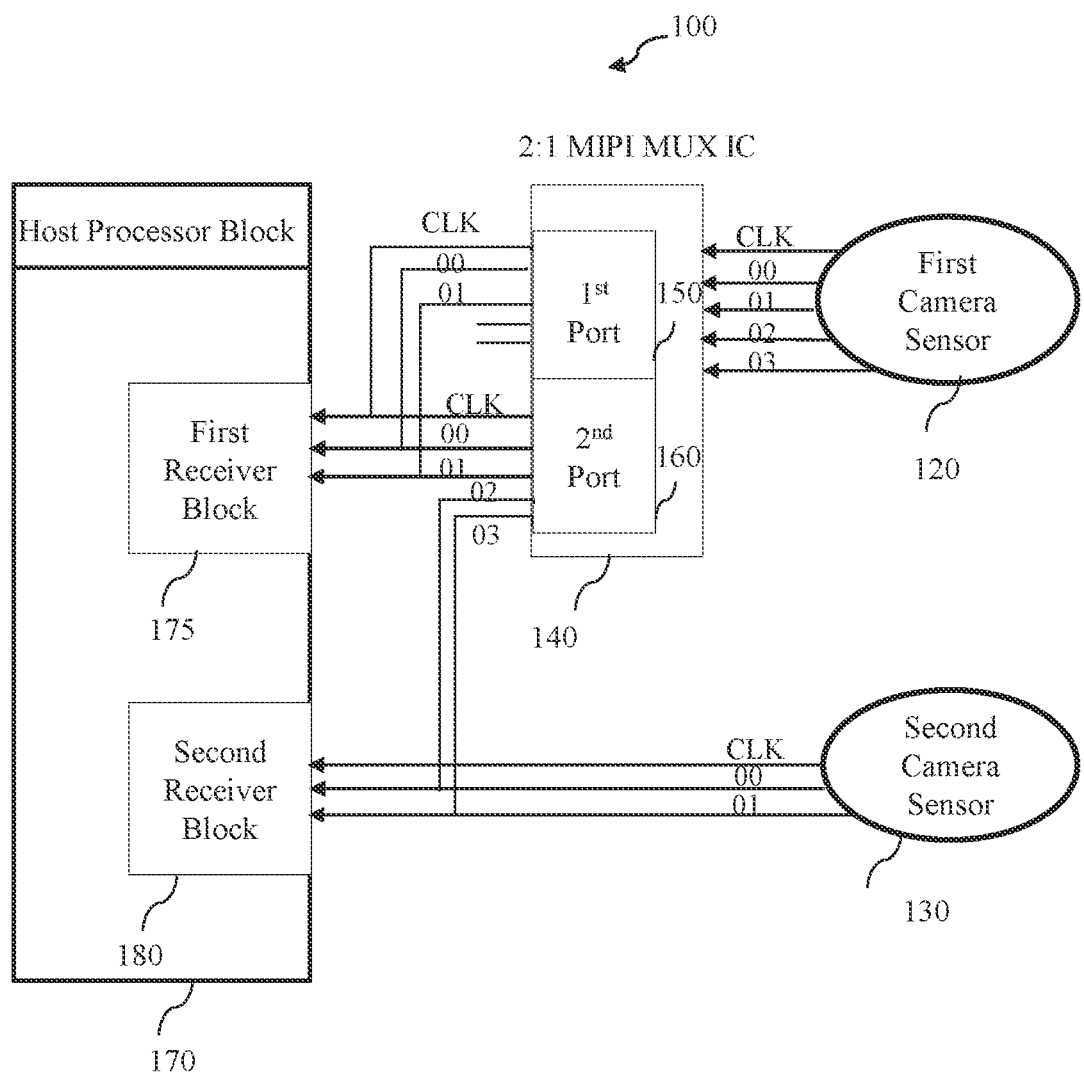
FIG. 2 illustrates a schematic representation of an exemplary embodiment of a system for camera serial interface lane implementation between camera sensor and host processor of FIG. 1 in accordance with an embodiment of the present disclosure.

FIG. 2 illustrates a schematic representation of an exemplary embodiment of a system 100 for camera serial interface lane implementation between camera sensor and host processor of FIG. 1 in accordance with an embodiment of the present disclosure. Considering an example, where the system 100 is utilised in one of an application area such as a medical diagnostic device. In such a scenario, the medical diagnostic device such as an endoscope is equipped with an embedded camera for medical diagnosis of an internal organ of human beings. Input data from such embedded camera is further transmitted to a host processor via a mobile industry processor interface (MIPI). The system 100 helps in providing camera serial interface lane implementation between camera sensor and the host processor. For receiving input data from the embedded cameras such as a first camera sensor and a second camera sensor in the example used herein, the system 100 includes an input data receiving unit 110. The input receiving unit 110 receives first input signal from the first camera sensor 120 in at least one of a two-lane camera serial interface (CSI) configuration or a four-lane camera serial interface configuration. For example, the first camera sensor 110 may include a two-lane (2-lane) camera sensor or a four-lane (4-lane) camera sensor. Also, the input data receiving unit 110 receives second input signal from the second camera sensor 130 in the two-lane camera serial interface configuration. In the example used herein, the first camera sensor and the second camera sensor may include at least one of a charge coupled device (CCD) sensor, an electron multiplying charge-coupled device sensor (EMCCD), a complementary metal oxide semiconductor sensor (CMOS) or a back illuminated complementary metal oxide semiconductor sensor.

Based on the first input signal and the second input signal is received, a data selector device 140 comprising a first port 150 and a second port 160, enables data selection. The first port enables selection of the first port 150 for forwarding input signal when the first input signal from the first camera sensor is received by the input data receiving unit 110 in the two-lane camera serial interface configuration. Again, the second port 160 is selected by the data selector device 140 for forwarding the input signal when the first input signal from the first camera sensor is received by the input data receiving unit in the four-lane camera serial interface configuration. In the example used herein, the data selector device may include a 2:1 mobile industry processor interface multiplexer integrated circuit (MIPI MUX IC). Also, such a data selector device 140 enables selection of the first port and the second port based on a predefined programmable logic.

The system 100 also includes a host processor block 170 which includes a first receiver block 175 configured to generate a first output signal when the first input signal is obtained from the first port selected in the two-lane camera serial interface configuration and the second port selected in the four-lane camera serial interface configuration respectively. Also, the host processor block 170 includes a second receiver block 180 configured to generate a second output signal when the first input signal is obtained from the second port selected in the four-lane camera serial interface configuration. Further, the host processor block 170 is configured to provide the interface with the first camera sensor 120 and the second camera sensor 130 for data transmission based on the first output signal and the second output signal generated. In the example used herein, the host processor block may include at least one of a Xavier system on module (SOM) camera serial interface processor such as including, but not limited to, NVIDIA$^R$ Jetson™, NXP i.MX8, Rockchip. Raspberry Pi 4, Google coral, Xilinx, NVIDIA TX2 and the like.

Also, the the first receiver block and the second receiver block of the host processor block 170 may include a dual lane camera serial interface block or a quad lane camera serial interface block. For example, the host processor is interfaced with the first camera sensor and the second camera sensor by using a single embedded board design architecture. The single embedded board design for both 4lane and 2lane camera interface between the host processor and camera sensor handles camera resolution, frame rate and format and the like.

Figure 3:
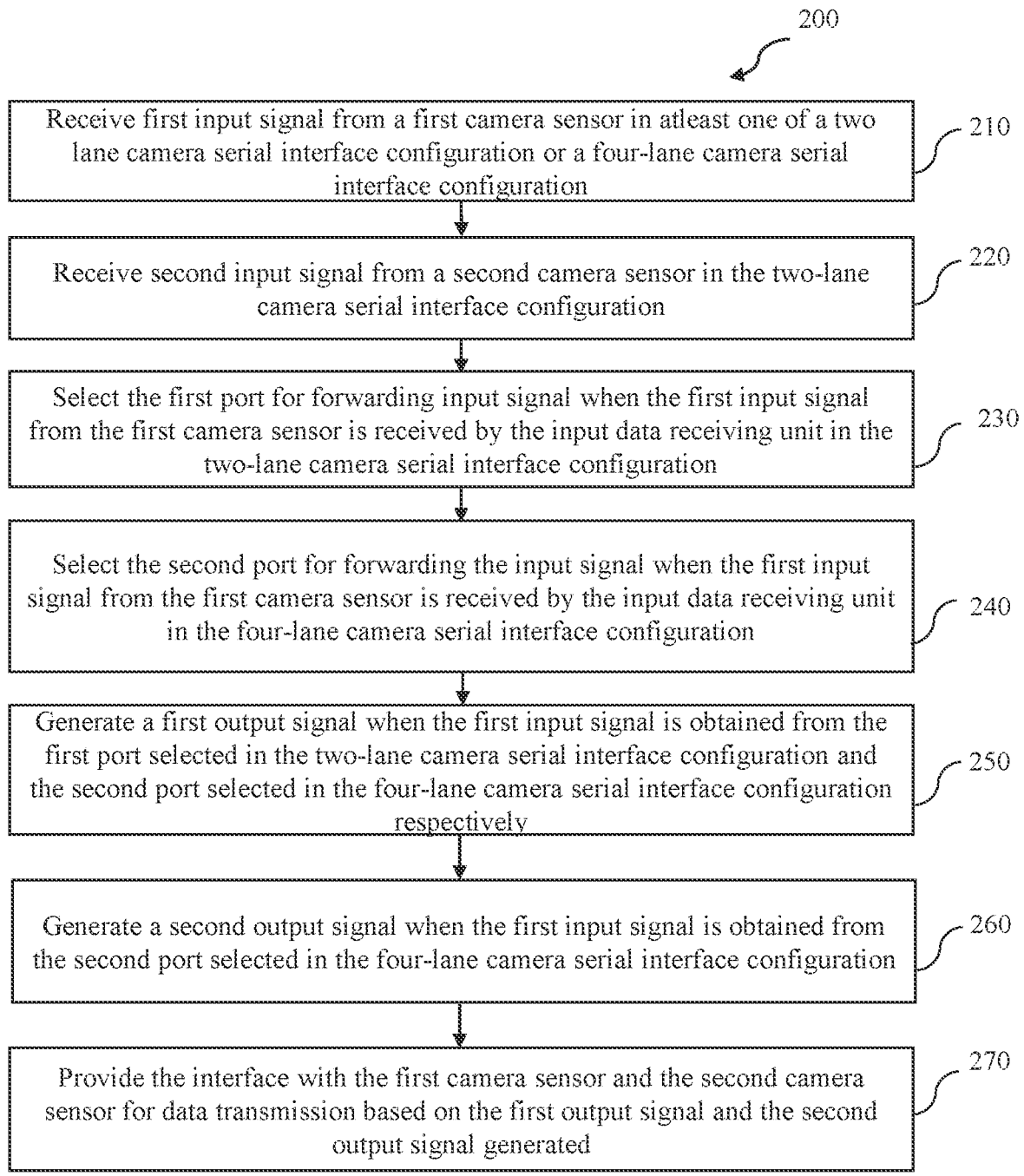
FIG. 3 is a flow chart representing the steps involved in a method for camera serial interface lane implementation between camera sensor and host processor of FIG. 1 in accordance with the embodiment of the present disclosure.

FIG. 3 is a flow chart representing the steps involved in a method 200 for camera serial interface lane implementation between camera sensor and host processor of FIG. 1 in accordance with the embodiment of the present disclosure. The method 200 includes receiving, by an input data receiving unit, first input signal from a first camera sensor in at least one of a two-lane camera serial interface configuration or a four-lane camera serial interface configuration in step 210. In one embodiment, receiving the first input signal from the first camera sensor may include receiving the first input signal from a two-lane camera sensor or a four-lane camera sensor.

The method 200 also includes receiving, by the input data receiving unit, second input signal from a second camera sensor in the two-lane camera serial interface configuration (CSI) in step 220. In some embodiment, receiving the second input signal from the second camera sensor in the two-lane CSI may include receiving the second input signal from a two-lane camera sensor. In such embodiment, the first camera sensor and the second camera sensor may include at least one of a charge coupled device (CCD) sensor, an electron multiplying charge-coupled device sensor (EMCCD), a complementary metal oxide semiconductor sensor (CMOS) or a back illuminated complementary metal oxide semiconductor sensor.

The method 200 also includes selecting, by a data selector device, the first port for forwarding input signal when the first input signal from the first camera sensor is received by the input data receiving unit in the two-lane camera serial interface configuration in step 230. In one embodiment, selecting the first port for forwarding the input signal may include selecting the first port for forwarding the input signal by a 2:1 mobile industry processor interface multiplexer integrated circuit (MIPI MUX IC). The method 200 also includes selecting, by the data selector device, the second port for forwarding the input signal when the first input signal from the first camera sensor is received by the input data receiving unit in the four-lane camera serial interface configuration in step 240. In some embodiment, selecting the first port and the second port for forwarding the input signal may include selecting the first port and the second port based on a predefined programmable logic. In such embodiment, the predefined programmable logic may include integrated circuit programming.

The method 200 also includes generating, by a first receiver block of a host processor, a first output signal w % ben the first input signal is obtained from the first port selected in the two-lane camera serial interface configuration and the second port selected in the four-lane camera serial interface configuration respectively in step 250. The method 200 also includes generating, by a second receiver block of the host processor, a second output signal when the first input signal is obtained from the second port selected in the four-lane camera serial interface configuration in step 260. The method 200 also includes providing, by the host processor, the interface with the first camera sensor and the second camera sensor for data transmission based on the first output signal and the second output signal generated in step 270.

Various embodiments of the present disclosure provide a system which supports single board design for Jetson Xavier processor MIPI receiver architecture, for any camera configuration, thereby reduces expenditure of configuring multiple embedded boards for different types of camera sensors as well as host processor.

Moreover, the present disclosed system supports different formats and resolutions of data from individual cameras or image sensor which further needs to be interfaced with the host processor.

Furthermore, the present disclosed system handles the complexities in providing interfaces between multiple cameras/sensors with MIPI interfaces with any host that is having MIPI receiver interface. Also, issues like trace stub in high frequencies MIPI lines are taken care in design itself.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for camera serial interface lane implementation between a camera sensor and a host processor interface comprising:
    an input data receiving unit configured to:
        receive first input signal from a first camera sensor in at least one of a two-lane camera serial interface configuration or a four-lane camera serial interface configuration; and
        receive second input signal from a second camera sensor in the two-lane camera serial interface configuration;
    a data selector device operatively coupled to the input data receiving unit, wherein the data selector device comprises a first port and a second port, wherein the data selector device is configured to:
        select the first port for forwarding input signal when the first input signal from the first camera sensor is received by the input data receiving unit in the two-lane camera serial interface configuration; and
        select the second port for forwarding the input signal when the first input signal from the first camera sensor is received by the input data receiving unit in the four-lane camera serial interface configuration;
    a host processor block operatively coupled to the data selector device and the input data receiving unit, wherein the host processor block comprises:
        a first receiver block configured to generate a first output signal when the first input signal obtained from the first port selected in the two-lane camera serial interface configuration and the second port selected in the four-lane camera serial interface configuration respectively; and
        a second receiver block configured to generate a second output signal when the first input signal is obtained from the second port selected in the four-lane camera serial interface configuration,
    wherein the host processor block is configured to provide the interface with the first camera sensor and the second camera sensor for data transmission based on the first output signal and the second output signal generated.

2. The system of claim 1, wherein the first camera sensor comprises a two-lane camera sensor or a four-lane camera sensor.

3. The system of claim 1, wherein the second camera sensor comprises a two-lane camera sensor.

4. The system of claim 1, wherein the first camera sensor and the second camera sensor comprise at least one of a charge coupled device sensor, an electron multiplying charge-coupled device sensor, a complementary metal oxide semiconductor sensor or a back illuminated complementary metal oxide semiconductor.

5. The system of claim 1, wherein the data selector device comprises a 2:1 mobile industry processor interface multiplexer integrated circuit.

6. The system of claim 1, wherein the data selector device enables selection of the first port and the second port based on a predefined programmable logic.

7. The system of claim 1, wherein the host processor block comprises at least one of a Xavier system on module camera serial interface processor.

8. The system of claim 1, wherein the first receiver block and the second receiver block comprise two dual lane camera serial interface block or a single quad lane camera serial interface block.

9. The system of claim 1, wherein the host processor is interfaced with the first camera sensor and the second camera sensor by using a single embedded board design architecture.

10. A method comprising:
receiving, by an input data receiving unit, first input signal from a first camera sensor in at least one of a two-lane camera serial interface configuration or a four-lane camera serial interface configuration;
receiving, by the input data receiving unit, second input signal from a second camera sensor in the two-lane camera serial interface configuration;
selecting, by a data selector device, a first port for forwarding input signal when the first input signal from the first camera sensor is received by the input data receiving unit in the two-lane camera serial interface configuration;
selecting, by the data selector device, a second port for forwarding the input signal when the first input signal from the first camera sensor is received by the input data receiving unit in the four-lane camera serial interface configuration;
generating, by a first receiver block of a host processor, a first output signal when the first input signal is obtained from the first port selected in the two-lane camera serial interface configuration and the second port selected in the four-lane camera serial interface configuration respectively;
generating, by a second receiver block of the host processor, a second output signal when the first input signal is obtained from the second port selected in the four-lane camera serial interface configuration; and
providing, by the host processor, the interface with the first camera sensor and the second camera sensor for data transmission based on the first output signal and the second output signal generated.

11. The method of claim 10, wherein receiving the first input signal from the first camera sensor comprises receiving the first input signal from a two-lane camera sensor or a four-lane camera sensor.

12. The method of claim 10, wherein receiving the second input signal from the second camera sensor comprises receiving the second input signal from a two-lane camera sensor.

13. The method of claim 10, wherein selecting the first port and the second port for forwarding the input signal comprises selecting the first port and the second port based on a predefined programmable logic.

14. The method of claim 10, wherein selecting the first port and the second port for forwarding the input signal comprises selecting the first port and the second port by a 2:1 mobile industry processor interface multiplexer integrated circuit.

* * * * *